No. 635,564. Patented Oct. 24, 1899.
K. MARTIN.
PLUMB LEVEL.
(Application filed Apr. 15, 1899.)
(No Model.)
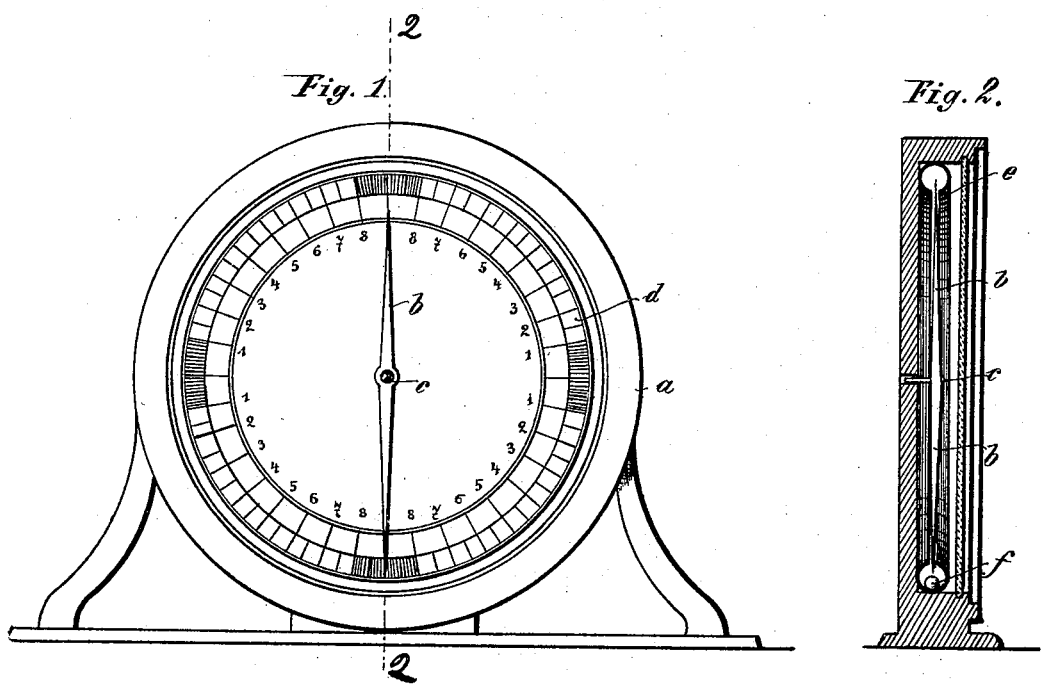
Witnesses.
Dennis Sumby.
Robert Everett.
Inventor.
Karl Martin.
By
James L. Norris.
Att'y.

UNITED STATES PATENT OFFICE.

KARL MARTIN, OF HOMBURG-VOR-DER-HÖHE, GERMANY.

PLUMB-LEVEL.

SPECIFICATION forming part of Letters Patent No. 635,564, dated October 24, 1899.

Application filed April 15, 1899. Serial No. 713,188. (No model.)

*To all whom it may concern:*

Be it known that I, KARL MARTIN, a subject of the King of Prussia, Emperor of Germany, residing at Homburg-vor-der-Höhe, in the Kingdom of Prussia, Germany, have invented certain new and useful Improvements in Levels, (for which I have applied for a patent in Germany, dated September 16, 1898,) of which the following is a specification.

This invention relates to an improved level; and it consists, essentially, of a magnetized indicating steel hand pivoted over a scale and surrounded by an annular tube, which is slotted throughout its entire length on the inner side and contains a soft-iron ball that can move freely.

In the accompanying drawings, representing this invention, Figure 1 is a front elevation, and Fig. 2 a vertical section on line 2 2 of Fig. 1.

Upon an upright board $a$ a magnetized indicating-hand $b$ is pivoted at $c$, so as to turn easily. A scale is attached on the board $a$, which would give in a circle or arc the deviation to the horizontal in degrees, minutes, and seconds. This scale is surrounded by a tube $e$, which is slotted throughout its entire length on the inner side or side next to the indicating-hand. Within this tube there is a soft-iron ball $f$, which can move freely, so that it always assumes the lowest position in the tube. As, however, the indicating-hand $b$ is made of magnetized steel, it will always move with the ball, and thus indicate the position of the latter on the scale.

What I claim, and desire to secure by Letters Patent of the United States, is—

1. A level consisting of a magnetized indicating steel hand which is pivoted over a scale and surrounded by an annular tube slotted throughout its entire length on the inner side which tube contains a soft-iron ball that can move freely, substantially as described.

2. A level consisting of a suitable casing having an annular way arranged therein, and a scale on its face, a magnetized indicating-hand pivoted to move over said scale, and a soft-iron body freely movable in said way and coöperating with the hand, substantially as described.

In testimony whereof I have hereunto set my hand in the presence of two witnesses.

KARL MARTIN.

Witnesses:
RICHARD GUENTHER,
JEAN GRUND.